(12) United States Patent
Liu

(10) Patent No.: US 11,899,347 B2
(45) Date of Patent: Feb. 13, 2024

(54) IMAGING SYSTEM AND PROJECTION DEVICE

(71) Applicant: Coretronic Corporation, Hsin-Chu (TW)

(72) Inventor: I-Ming Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/565,468

(22) Filed: Dec. 30, 2021

(65) Prior Publication Data

US 2023/0109394 A1 Apr. 6, 2023

(30) Foreign Application Priority Data

Sep. 28, 2021 (CN) .......................... 202111140003.1

(51) Int. Cl.
*G03B 21/14* (2006.01)
*G03B 21/20* (2006.01)
*G02B 27/28* (2006.01)
*G03B 21/00* (2006.01)
*G02B 27/10* (2006.01)

(52) U.S. Cl.
CPC ....... *G03B 21/147* (2013.01); *G02B 27/1026* (2013.01); *G02B 27/283* (2013.01); *G03B 21/006* (2013.01); *G03B 21/2066* (2013.01); *G03B 21/2073* (2013.01)

(58) Field of Classification Search
CPC ............... G03B 21/147; G03B 21/006; G03B 21/2066; G03B 21/2073; G02B 27/1026; G02B 27/283
See application file for complete search history.

(56) References Cited

U.S. PATENT DOCUMENTS

| 9,835,936 | B2* | 12/2017 | Natsume | G03B 21/006 |
| 2018/0088449 | A1* | 3/2018 | Hatano | G03B 21/147 |
| 2021/0216002 | A1* | 7/2021 | Tomaru | G03B 21/006 |
| 2022/0100063 | A1* | 3/2022 | Ko | G03B 21/006 |

FOREIGN PATENT DOCUMENTS

| CN | 213149445 | | 5/2021 | |
| JP | 2004138913 A | * | 5/2004 | G03B 21/14 |
| KR | 2004050972 A | * | 6/2004 | H04N 5/74 |

* cited by examiner

*Primary Examiner* — Magda Cruz
(74) *Attorney, Agent, or Firm* — JCIPRNET

(57) ABSTRACT

An imaging system including a housing, a light-splitting element, a light valve module, and a compensation module is provided. The light valve module is disposed on a transmission path of an illumination beam and is configured to convert the illumination beam into an image beam. The light-splitting element is disposed on the transmission path of the illumination beam and is configured to reflect the illumination beam and allow the image beam to pass through. The compensation module is disposed between the light valve module and the light-splitting element. The compensation module includes a carrier element and a compensation element. The carrier element includes a slot. The carrier element is configured to rotate around a rotation axis. The compensation element is disposed in the slot and is located on the transmission path of the illumination beam and a transmission path of the image beam.

18 Claims, 7 Drawing Sheets

IMAGING SYSTEM AND PROJECTION DEVICE

CROSS-REFERENCE TO RELATED APPLICATION

This application claims the priority benefit of China application serial no. 202111140003.1, filed on Sep. 28, 2021. The entirety of the above-mentioned patent application is hereby incorporated by reference herein and made a part of this specification.

BACKGROUND

Technical Field

The invention relates to an optical system and a display device, and in particular, to an imaging system and a projection device adopting the imaging system.

Description of Related Art

Projection devices, such as projectors, are display devices applied to generating large images. As technology advances and innovates, the projection devices are making constant progress. According to the imaging principle of the projection devices, an illumination beam generated by an illumination system is converted into an image beam through a light valve, and the image beam is projected to a projection target (e.g. a screen or a wall surface) through a projection lens to form a projection image.

In a projection device with a light valve that is liquid crystal on silicon (LCoS), the contrast and the brightness commonly fail to meet a default value requirement. When a light of a light source is reflected to the liquid crystal on silicon through a polarizing beam splitter (PBS) and is reflected through the liquid crystal on silicon and passes through the polarizing beam splitter and the projection lens to be output, a polarization direction of the light reflected by the liquid crystal on silicon cannot be consistent at all. Therefore, the brightness and the contrast may be insufficient.

Currently, a compensation plate is adopted to adjust the inconsistency of the polarized light caused by the liquid crystal on silicon to achieve the most favorable functions such as the brightness, the contrast, and the image quality. However, in the conventional design, in the projection device with the compensation plate, there is an issue of limited adjustment of a polarization angle. In addition, when the compensation plate is adopted to adjust the polarization angle, a fixing base of the compensation plate is pressed by a dustproof cover fastened by a screw, which does not allow fixed installation and may cause deviation. Furthermore, when an angle of a phase difference of the compensation plate exceeds 45 degrees, a component with the correct phase angle cannot be replaced and the polarization angle is thus unable to be adjusted. Moreover, a design with a single polarizer cannot achieve favorable efficiency.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to an imaging system and a projection device capable of promoting convenience and accuracy of adjusting an angle of a compensation element.

Other objectives and advantages of the invention may further be understood from technical features disclosed in the invention.

In order to achieve one or some or all of the above purposes or other purposes, the invention provides an imaging system including a housing, a light-splitting element, a light valve module, and a compensation module. The light valve module is disposed on a transmission path of an illumination beam and is configured to convert the illumination beam into an image beam. The light-splitting element is disposed on the transmission path of the illumination beam and is configured to reflect the illumination beam and allow the image beam to pass through. The compensation module is disposed between the light valve module and the light-splitting element. The compensation module includes a carrier element and a compensation element. The carrier element includes a slot. The carrier element is configured to rotate around a rotation axis. The compensation element is disposed in the slot and is located on the transmission path of the illumination beam and a transmission path of the image beam.

In order to achieve one or some or all of the above purposes or other purposes, the invention further provides a projection device including an illumination system, an imaging system, and a projection lens. The illumination system is configured to provide an illumination beam. The imaging system includes a housing, a light-splitting element, a light valve module, and a compensation module. The light valve module is disposed on a transmission path of the illumination beam and is configured to convert the illumination beam into an image beam. The light-splitting element is disposed on the transmission path of the illumination beam and is configured to reflect the illumination beam and allow the image beam to pass through. The compensation module is disposed between the light valve module and the light-splitting element. The compensation module includes a carrier element and a compensation element. The carrier element includes a slot. The carrier element is configured to rotate around a rotation axis. The compensation element is disposed in the slot and is located on the transmission path of the illumination beam and a transmission path of the image beam. The projection lens is disposed on the transmission path of the image beam and is configured to project the image beam out of the projection device.

Based on the above, the embodiments of the invention have a least one of the following advantages or effects. In the imaging system and the projection device of the invention, the imaging system includes the compensation module disposed between the light valve module and the light-splitting element. The compensation module includes the carrier element and the compensation element. The compensation element is disposed in the slot of the carrier element, and an adjustment element detachably can fix the carrier element. The carrier element can rotate around the rotation axis. Therefore, a user can adjust a rotation angle of the compensation element. In this way, the angle of the compensation element can be adjusted without disassembling the housing. Hence, an error due to disassembling or assembling the housing is further avoided, and, at the same time, the convenience and accuracy of adjusting the compensation element can be promoted.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
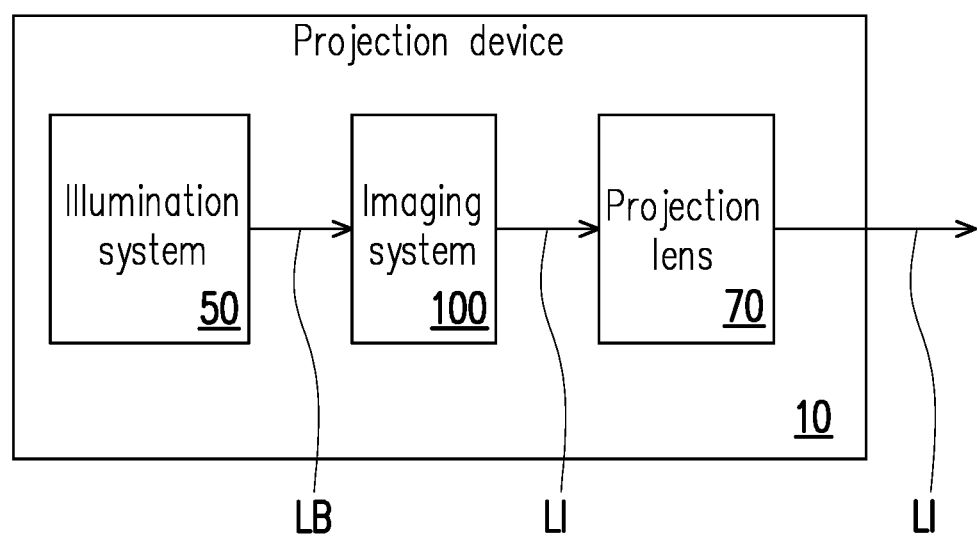
FIG. 1 is a schematic diagram of a projection device according to an embodiment of the invention.

FIG. 1 is a schematic diagram of a projection device according to an embodiment of the invention. Referring to FIG. 1, the embodiment provides a projection device 10 including an illumination system 50, an imaging system 100, and a projection lens 70. The illumination system 50 is configured to provide an illumination beam LB. The imaging system 100 is disposed on a transmission path of the illumination beam LB and is configured to convert the illumination beam LB into an image beam LI. The projection lens 70 is disposed on a transmission path of the image beam LI and is configured to project the image beam LI out of the projection device 10 to a projection target (not shown), such as a screen or a wall surface.

For example, the illumination system 50 has multiple light emitting sources such as light emitting diodes (LED), laser light diodes, or light bulbs. According to different light emitting sources, other optical elements such as a wavelength conversion element, a light-homogenization element, a light-filtering element, or multiple light splitting and combining elements may be adopted to provide a beam with a different wavelength (color) as a source of the illumination beam LB. However, the invention is not intended to limit types or forms of the illumination system 50 in the projection device 10. A detailed structure and implementation thereof may be designed by a manufacturer, and relevant details may not be repeated in the following.

The projection lens 70, for example, includes a combination of one or multiple optical lens with a refractive power, such as various combinations of non-plane lenses including a biconcave lens, a biconvex lens, a concave-convex lens, a convex-concave lens, a plano-convex lens, a plano-concave lens, etc. In an embodiment, the projection lens 70 may further include a planar optical lens to project the image beam LI from the imaging system 100 to the projection target in a way of reflection. The invention is not intended to limit the types and forms of the projection lens 70.

Figure 2:
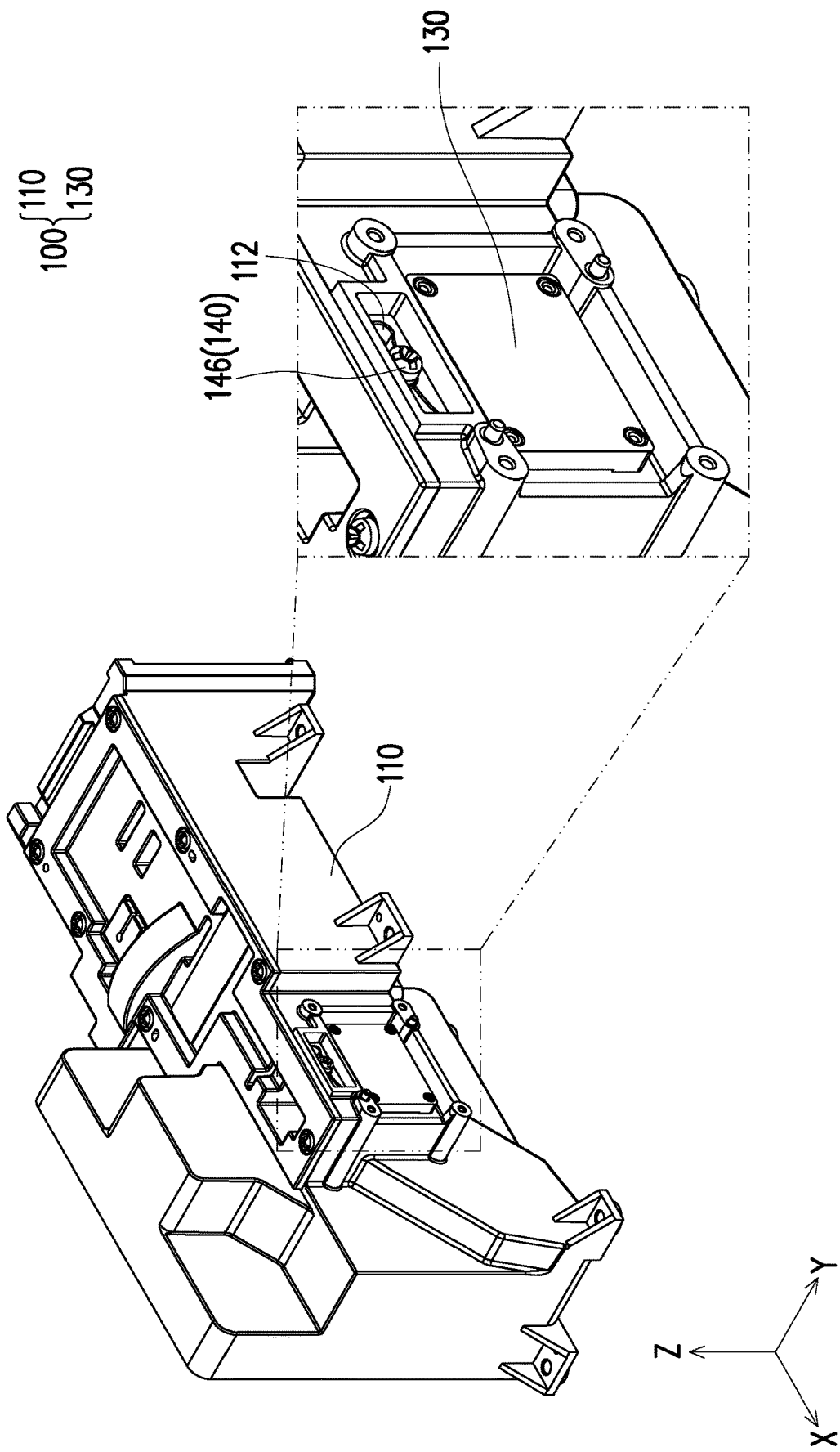
FIG. 2 is a schematic perspective diagram of a partial projection device according to an embodiment of the invention.
Figure 3:
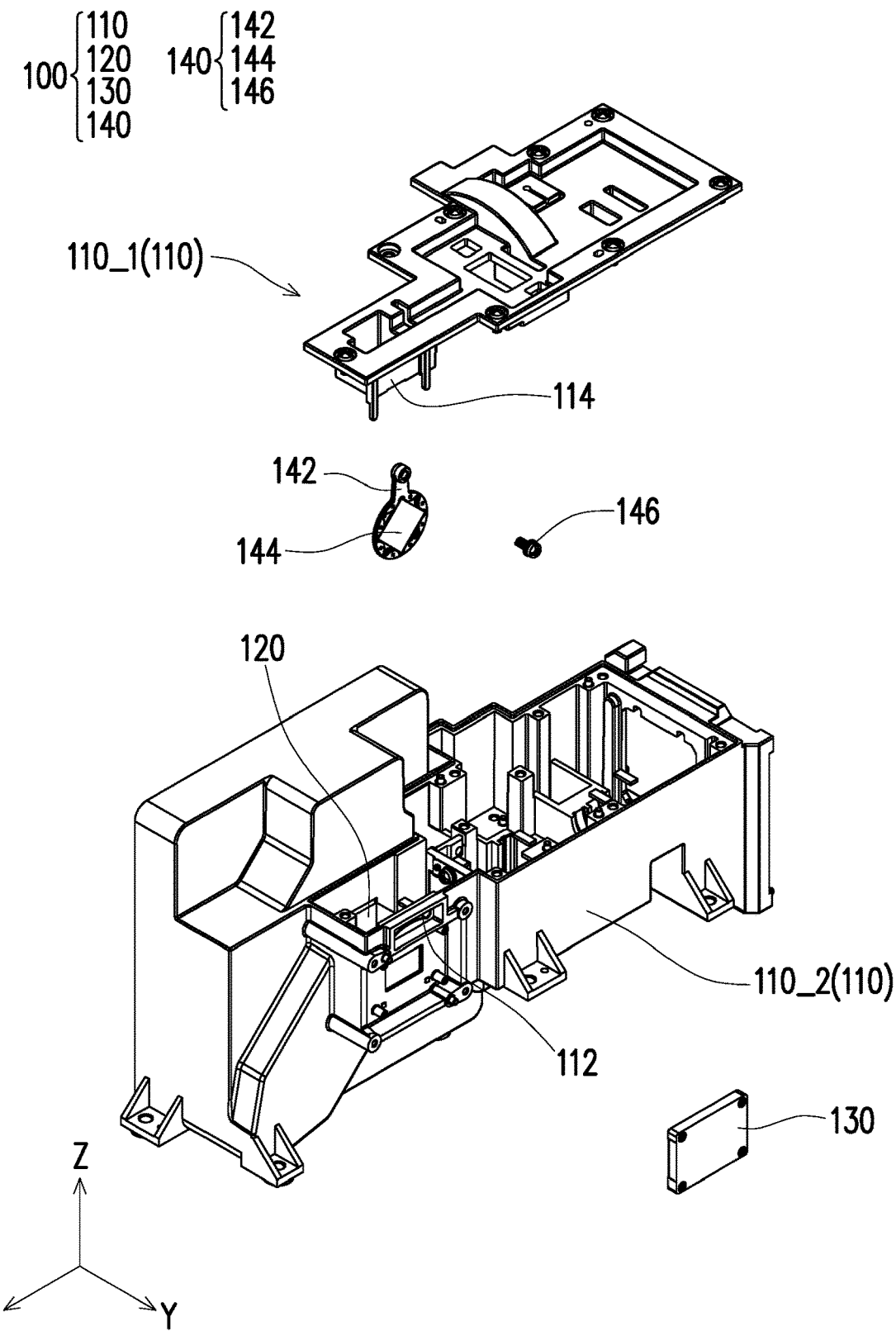
FIG. 3 is an exploded perspective diagram of the partial projection device in FIG. 2.
Figure 4:
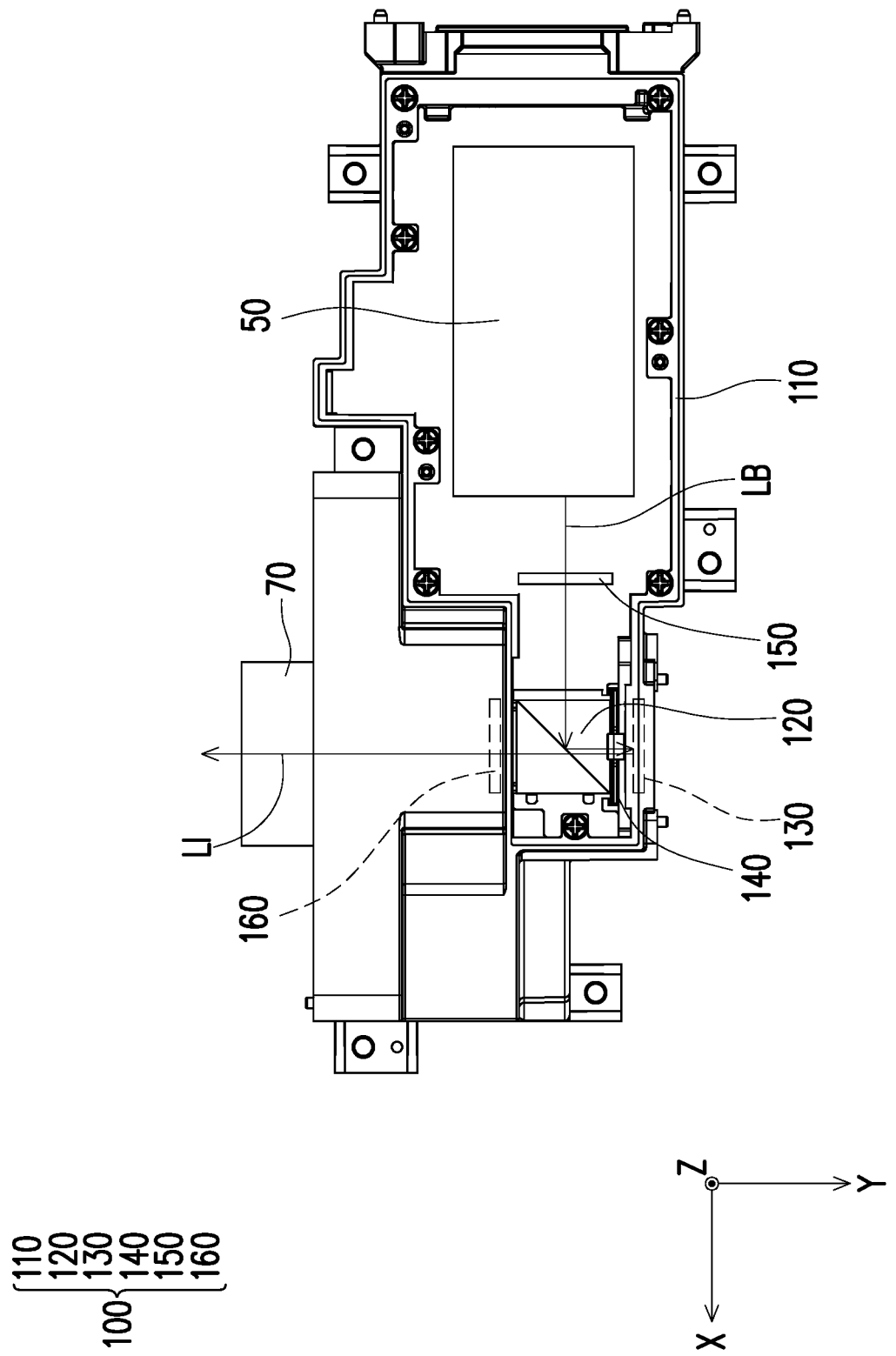
FIG. 4 is a schematic diagram of a light path of the partial projection device in FIG. 2.

FIG. 2 is a schematic perspective diagram of a partial projection device according to an embodiment of the invention. FIG. 3 is an exploded perspective diagram of the partial projection device in FIG. 2. FIG. 4 is a schematic diagram of a light path of the partial projection device in FIG. 2. Referring to FIG. 2 to FIG. 4, the partial projection device 10 shown in FIG. 2 is applied to the projection device 10 in FIG. 1. The imaging system 100 includes a housing 110, a light-splitting element 120, a light valve module 130, and a compensation module 140. The housing 110 is configured to accommodate the light-splitting element 120, the light valve module 130, and the compensation module 140. The housing 110 is connected to the illumination system 50 and the projection lens 70 (not shown).

The light-splitting element 120 is disposed on the transmission path of the illumination beam LB and the transmission path of the image beam LI, and the light-splitting element 120 is configured to reflect the illumination beam LB and allow the image beam LI to pass through. In the embodiment, the light-splitting element 120 is, for example, a polarizing beam splitter (PBS).

The light valve module 130 is disposed on the transmission path of the illumination beam LB and is configured to convert the illumination beam LB into the image beam LI. In the embodiment, the light valve module 130 includes, for example, a liquid crystal on silicon panel (LCoS panel) and a control circuit thereof.

Figure 5:
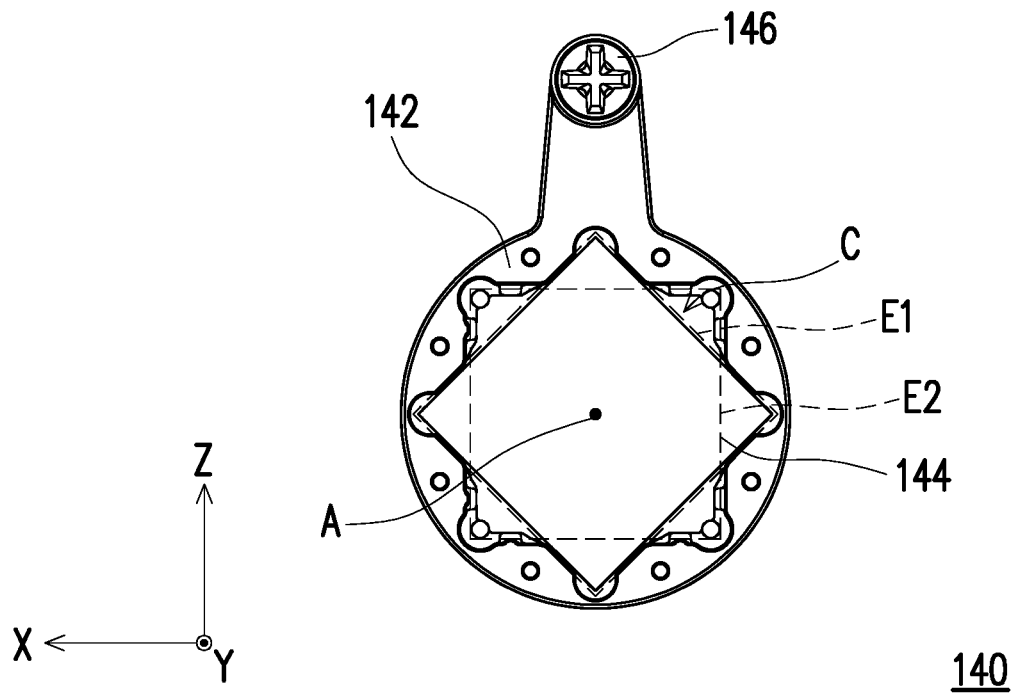
FIG. 5 and FIG. 6 are respectively schematic diagrams of a compensation module of the projection device in FIG. 2 in different configurations.
Figure 6:
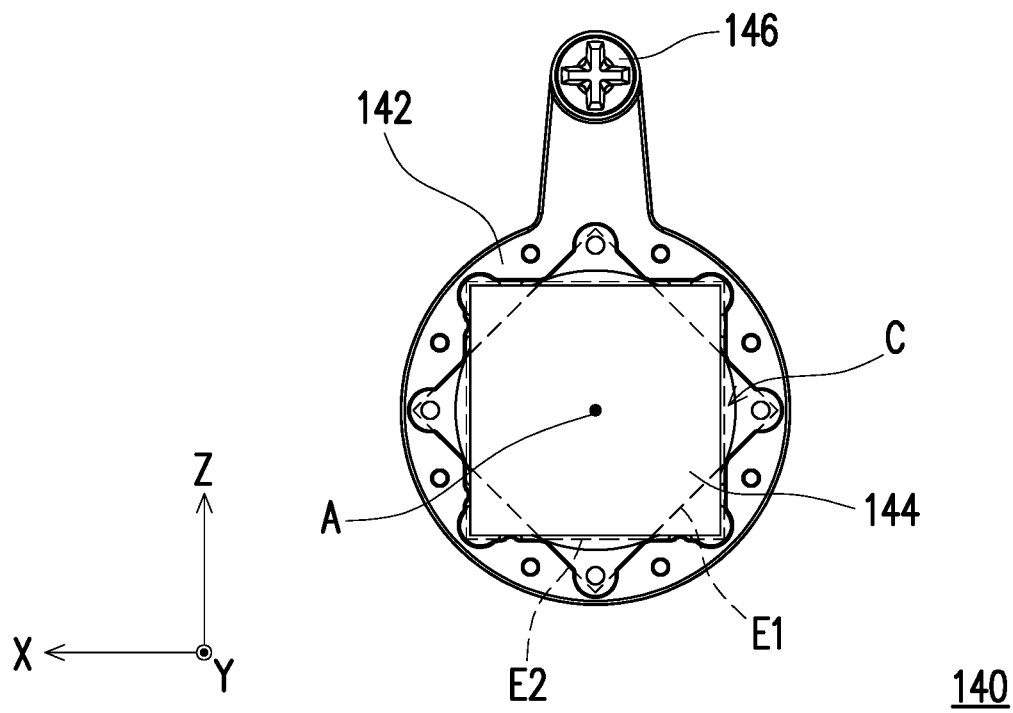

FIG. 5 and FIG. 6 are respectively schematic diagrams of a compensation module of the projection device in FIG. 2 in different configurations. Referring to FIG. 2 to FIG. 5, the compensation module 140 is disposed between the light valve module 130 and the light-splitting element 120. In the embodiment, the housing 110 includes an installation slot configured to allow the compensation module 140 to be inserted to be installed in the housing 110. The compensation module 140 includes a carrier element 142, a compensation element 144, and an adjustment element 146. The carrier element 142 includes a slot C. The compensation element 144 is disposed in the slot C. The compensation element 144 is located on the transmission path of the illumination beam LB and the transmission path of the image beam LI. The compensation element 144 is configured to adjust a linear polarization direction of a beam, such as a polarization direction of the illumination beam LB and a polarization direction of the image beam LI. In the embodiment, the compensation element 144 is, for example, a quarter wave plate. Therefore, when the illumination beam LB is transmitted to the light-splitting element 120, the illumination beam LB is reflected by the light-splitting element 120 and is sequentially transmitted to the compensation element 144 and the light valve module 130 to form the image beam LI. The image beam LI is emitted by the light valve module 130. The image beam LI sequentially passes through the compensation element 144 and the light-splitting element 120. The linear polarization direction of the beam may be adjusted through passing though the compensation element 144 twice.

The adjustment element 146 is configured to detachably fix the carrier element 142. The carrier element 142 is configured to rotate around a rotation axis A according to a position of the adjustment element 146. The rotation axis A is located at a center of the compensation element 144 and is perpendicular to a light emitting surface of the compensation element 144. The adjustment element 146 is, for example, a fastening screw. In other words, when the adjustment element 146 is detached or loosened, a user may move the carrier element 142 to rotate to the left or to the right so that the carrier element 142 rotates around the rotation axis A and an angle of the compensation element 144 is adjusted. For example, in the embodiment, the adjustment element 146 may be detachably fastened on a protruding structure of the carrier element 142, as shown in FIG. 5. In this way, the angle of the compensation element 144 may be adjusted without disassembling the housing 110. Hence, an error of the carrier element 142 (such as poorly fixed installation or deviation) due to disassembling or assembling the housing 110 is further avoided, and, at the same time, the convenience and accuracy of adjusting the compensation element 144 may be promoted.

Referring to FIG. 5 and FIG. 6 together, specifically, in the embodiment, the slot C of the carrier element 142 further includes a first space E1 and a second space E2. The compensation element 144 may be disposed in the first space E1 (as shown in FIG. 5) or disposed in the second space E2 (as shown in FIG. 6) according to requirement configuration. An angle of the compensation element 144 disposed in the first space E1 and an angle of the compensation element 144 disposed in the second space E2 differ by 45 degrees. In other words, when an angle of a phase difference of the compensation element 144 is exceeded, an assembly position of the compensation element 144 may be changed and the compensation element 144 is fixed on the carrier element 142 in response to a change of a phase angle. In addition, a rotation angle of the carrier element 142 may be further designed to be substantially greater than 40 degrees and less than 50 degrees. In a preferred embodiment, the rotation angle of the carrier element 142 is 46 degrees (i.e. the carrier element 142 may rotate 23 degrees positively and negatively).

Figure 7:
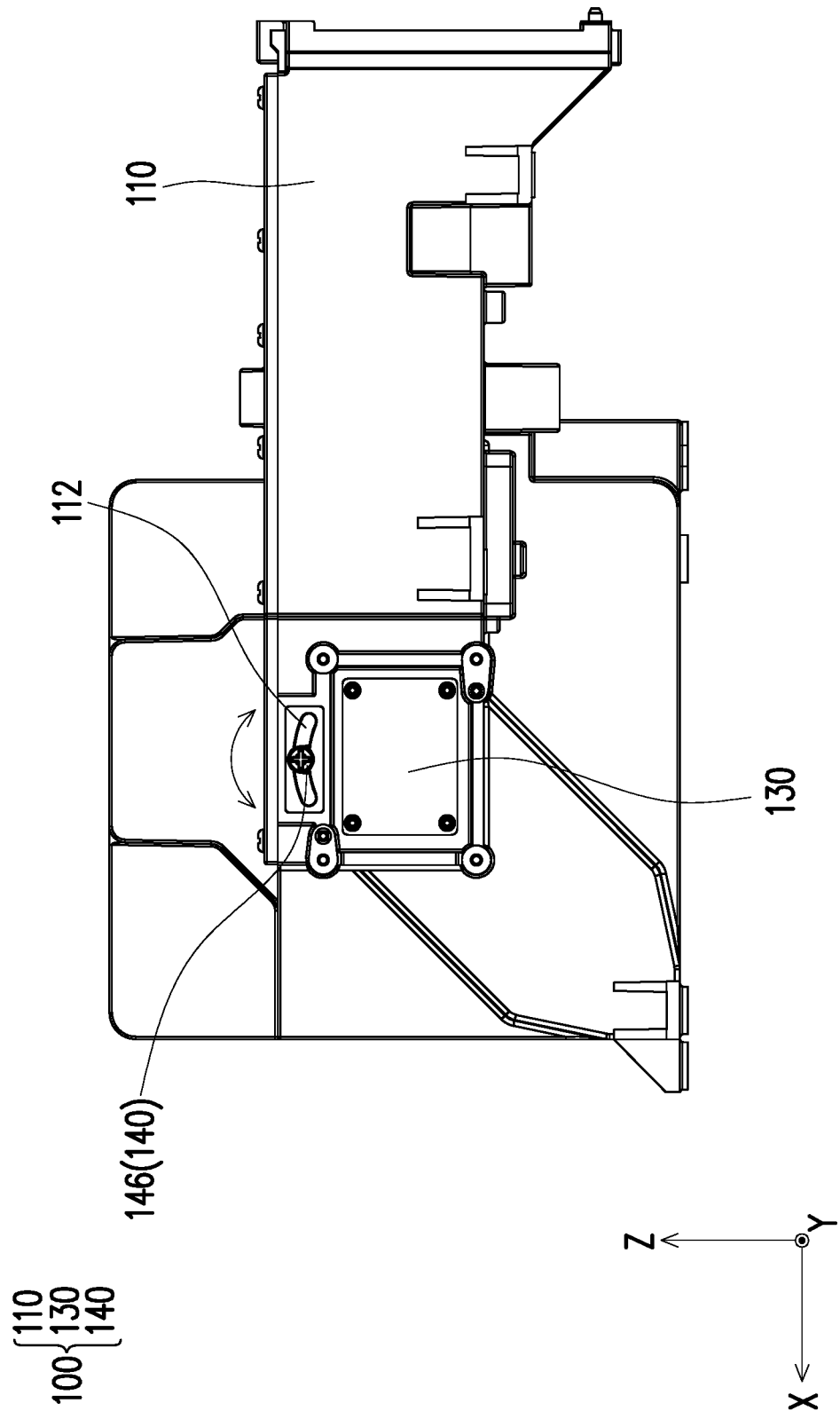
FIG. 7 is a schematic rear view of the partial projection device in FIG. 2.

FIG. 7 is a schematic rear view of the partial projection device in FIG. 2. Referring to FIG. 2, FIG. 3, FIG. 5, and FIG. 7, more specifically, in the embodiment, the housing 110 further includes a position limiting trench 112 (located at a second part 110_2 of the housing 110) and a position limiting wall 114 (located at a first part 110_1 of the housing 110). The protruding structure in the carrier element 142 of the compensation module 140 is located in the position limiting trench 112. The adjustment element 146 of the compensation module 140 is located in the position limiting trench 112, and the adjustment element 146 is configured to drive the carrier element 142 to rotate by changing the position of the adjustment element 146 in the position limiting trench 112. For example, in the embodiment, the position limiting trench 112 is arc-shaped, as shown in FIG. 7. Therefore, the user may adjust the rotation angle of the compensation element 144 by moving the adjustment element 146 in the position limiting trench 112. In addition, the adjustment element 146 of the compensation module 140 abuts against the position limiting wall 114 to fix the carrier element 142. Specifically, when the user desires to fix the rotation angle of the compensation element 144, the user may tighten the adjustment element 146. The carrier element 142 is clamped through the adjustment element 146 and the position limiting wall 114. When the user desires to adjust the rotation angle of the compensation element 144, the user may loosen the adjustment element 146 for adjustment. In this way, the rotation angle of the compensation element 144 may be adjusted without disassembling the housing 110. Hence, the error due to disassembling or assembling the housing 110 is further avoided, and, at the same time, the convenience and accuracy of adjusting the compensation element 144 may be promoted.

Referring to FIG. 3, in other embodiments, the first part 110_1 of the housing 110 has an opening (not shown). The carrier element 142 is in the position limiting trench 112. The user may adjust the rotation angle of the compensation element 144 by loosening the adjustment element 146 downwards according to the negative Z axis and moving the carrier element 142 in the position limiting trench 112 through the opening. In this way, the rotation angle of the compensation element 144 may be adjusted without disassembling the housing 110. Hence, the error due to disassembling or assembling the housing 110 is further avoided, and, at the same time, the convenience and accuracy of adjusting the compensation element 144 may be promoted.

Figure 8:
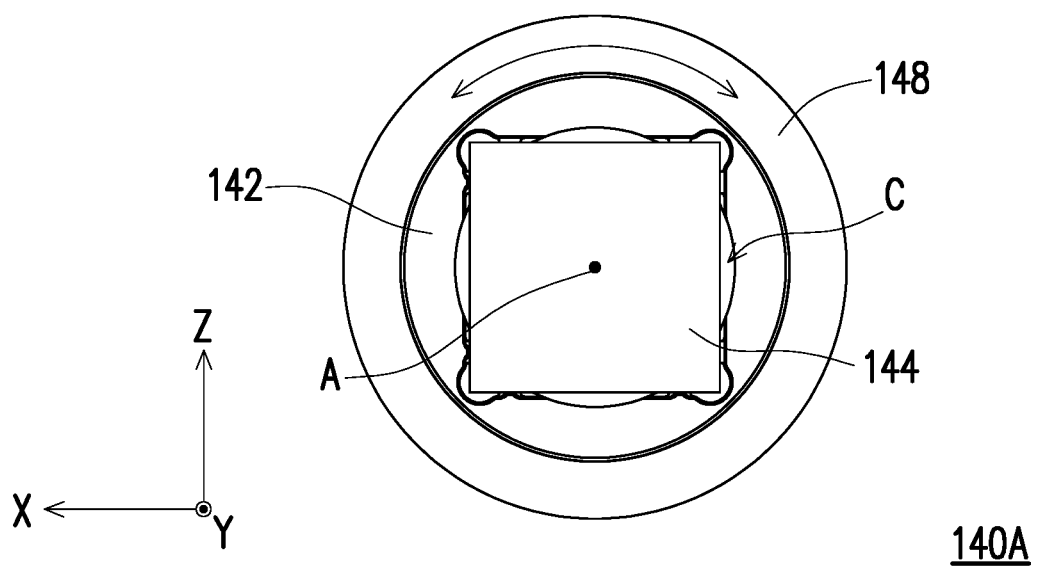
FIG. 8 is a schematic diagram of a compensation module according to another embodiment of the invention.

FIG. 8 is a schematic diagram of a compensation module according to another embodiment. Referring to FIG. 8, a compensation module 140A shown in the embodiment is similar to the compensation module 140 shown in FIG. 5. The difference is that in the embodiment, the compensation module 140A further includes a gear turntable 148 disposed on the carrier element 142. The gear turntable 148 is configured to rotate around the rotation axis A to drive the carrier element 142 to rotate. Therefore, by using the gear turntable 148, the rotation angle of the carrier element 142 may be increased to 360 degrees to adjust the angle of the compensation element 144 and, at the same time, the convenience and accuracy of adjusting the compensation element 144 may be promoted. Furthermore, a volume may be further reduced, and more space is available.

Referring to FIG. 4 again, in the embodiment, the imaging system 100 further includes a first polarization element 150 and a second polarization element 160. The first polarization element 150 is disposed on the transmission path of the illumination beam LB. The second polarization element 160 is disposed on the transmission path of the image beam LI. The illumination beam LB is sequentially transmitted to the first polarization element 150, the light-splitting element 120, the compensation module 140, and the light valve module 130. The image beam LI is sequentially transmitted to the compensation module 140, the light-splitting element 120, and the second polarization element 160 from the light valve module 130. The first polarization element 150 and the second polarization element 160 are, for example, linear polarizers configured to cause a polarization state of a passing beam to be consistent. Therefore, with the two linear polarizers provided, a light emitting efficiency may be further promoted to promote the most favorable brightness, contrast, and image quality.

In summary, in the imaging system and the projection device of the invention, the imaging system includes the compensation module disposed between the light valve module and the light-splitting element. The compensation module includes the carrier element, the compensation element, and the adjustment element. The compensation element is disposed in the slot of the carrier element, and the adjustment element may detachably fix the carrier element. The carrier element may rotate around the rotation axis according to the position of the adjustment element. Therefore, the user may adjust the rotation angle of the compensation element by moving the adjustment element. In this way, the angle of the compensation element may be adjusted without disassembling the housing. Hence, the error due to disassembling or assembling the housing is further avoided, and, at the same time, the convenience and accuracy of adjustment may be promoted.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An imaging system comprising a housing, a light-splitting element, a light valve module, and a compensation module, wherein:
   the light valve module is disposed on a transmission path of an illumination beam and is configured to convert the illumination beam into an image beam;
   the light-splitting element is disposed on the transmission path of the illumination beam and is configured to reflect the illumination beam and allow the image beam to pass through; and
   the compensation module is disposed between the light valve module and the light-splitting element, and the compensation module comprises a carrier element, a compensation element and an adjustment element, wherein the adjustment element is configured to detachably fix the carrier element, wherein:
      the carrier element comprises a slot, the carrier element is configured to rotate around a rotation axis; and
      the compensation element is disposed in the slot and is located on the transmission path of the illumination beam and a transmission path of the image beam,
   wherein the carrier element is configured to rotate around the rotation axis according to a position of the adjustment element, the housing comprises a position limiting trench, the adjustment element is located in the position limiting trench, and the adjustment element is configured to change the position in the position limiting trench so as to rotate the carrier element.

2. The imaging system according to claim 1, wherein the slot comprises a first space and a second space, the compensation element is disposed in the first space or the second space, and an angle of the compensation element disposed in the first space and an angle of the compensation element disposed in the second space differ by 45 degrees.

3. The imaging system according to claim 1, wherein the position limiting trench is arc-shaped.

4. The imaging system according to claim 1, wherein the housing comprises a position limiting wall, and the adjustment element abuts against the position limiting wall to fix the carrier element.

5. The imaging system according to claim 1, wherein a rotation angle of the carrier element is substantially greater than 40 degrees and less than 50 degrees.

6. The imaging system according to claim 1, wherein the compensation module further comprises a gear turntable disposed on the carrier element, and the gear turntable is configured to rotate around the rotation axis to drive the carrier element to rotate.

7. The imaging system according to claim 1, wherein the light valve module comprises a reflective liquid crystal on silicon panel.

8. The imaging system according to claim 1, wherein the compensation element is a quarter wave plate.

9. The imaging system according to claim 1, further comprising a first polarization element and a second polarization element, wherein:
the first polarization element is disposed on the transmission path of the illumination beam, and the illumination beam is sequentially transmitted to the first polarization element, the light-splitting element, the compensation module, and the light valve module; and
the second polarization element is disposed on the transmission path of the image beam, and the image beam is sequentially transmitted to the compensation module, the light-splitting element, and the second polarization element from the light valve module.

10. A projection device, comprising an illumination system, an imaging system, and a projection lens, wherein:
the illumination system is configured to provide an illumination beam;
the imaging system comprising a housing, a light-splitting element, a light valve module, and a compensation module, wherein:
the light valve module is disposed on a transmission path of the illumination beam and is configured to convert the illumination beam into an image beam;
the light-splitting element is disposed on the transmission path of the illumination beam and is configured to reflect the illumination beam and allow the image beam to pass through;
the compensation module is disposed between the light valve module and the light-splitting element, and the compensation module comprises a carrier element, a compensation element and an adjustment element, wherein the adjustment element is configured to detachably fix the carrier element, wherein:
the carrier element comprises a slot, the carrier element is configured to rotate around a rotation axis;
the compensation element is disposed in the slot and is located on the transmission path of the illumination beam and a transmission path of the image beam,
wherein the carrier element is configured to rotate around the rotation axis according to a position of the adjustment element, the housing comprises a position limiting trench, the adjustment element is located in the position limiting trench, and the adjustment element is configured to change the position in the position limiting trench so as to rotate the carrier element; and
the projection lens is disposed on the transmission path of the image beam and is configured to project the image beam out of the projection device.

11. The projection device according to claim 10, wherein the slot comprises a first space and a second space, the compensation element is disposed in the first space or the second space, and an angle of the compensation element disposed in the first space and an angle of the compensation element disposed in the second space differ by 45 degrees.

12. The projection device according to claim 10, wherein the position limiting trench is arc-shaped.

13. The projection device according to claim 10, wherein the housing comprises a position limiting wall, and the adjustment element abuts against the position limiting wall to fix the carrier element.

14. The projection device according to claim 10, wherein a rotation angle of the carrier element is substantially greater than 40 degrees and less than 50 degrees.

15. The projection device according to claim 10, wherein the compensation module further comprises a gear turntable disposed on the carrier element, and the gear turntable is configured to rotate around the rotation axis to drive the carrier element to rotate.

16. The projection device according to claim 10, wherein the light valve module comprises a reflective liquid crystal on silicon panel.

17. The projection device according to claim 10, wherein the compensation element is a quarter wave plate.

18. The projection device according to claim 10, wherein the imaging system further comprises a first polarization element and a second polarization element, wherein:
the first polarization element is disposed on the transmission path of the illumination beam, and the illumination beam is sequentially transmitted to the first polarization element, the light-splitting element, the compensation module, and the light valve module; and
the second polarization element is disposed on the transmission path of the image beam, and the image beam is sequentially transmitted to the compensation module, the light-splitting element, and the second polarization element from the light valve module.

* * * * *